United States Patent
Johri et al.

(10) Patent No.: US 9,435,432 B2
(45) Date of Patent: *Sep. 6, 2016

(54) SYSTEMS AND METHODS FOR DRIVELINE TORQUE CONTROL

(71) Applicant: Ford Global Technologies, LLC, Dearborn, MI (US)

(72) Inventors: Rajit Johri, Ann Arbor, MI (US); Jeffrey Allen Doering, Canton, MI (US); Mark Steven Yamazaki, Canton, MI (US); Wei Liang, Farmington Hills, MI (US); Xiaoyong Wang, Novi, MI (US); Dennis Craig Reed, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 54 days.

This patent is subject to a terminal disclaimer.

(21) Appl. No.: 14/156,343

(22) Filed: Jan. 15, 2014

(65) Prior Publication Data

US 2015/0198243 A1    Jul. 16, 2015

(51) Int. Cl.
| | |
|---|---|
| B60L 9/00 | (2006.01) |
| F16H 61/14 | (2006.01) |
| B60W 10/02 | (2006.01) |
| B60W 10/06 | (2006.01) |
| B60W 10/08 | (2006.01) |
| B60W 20/00 | (2016.01) |
| B60W 30/188 | (2012.01) |

(52) U.S. Cl.
CPC .......... *F16H 61/143* (2013.01); *B60W 10/023* (2013.01); *B60W 10/06* (2013.01); *B60W 10/08* (2013.01); *B60W 20/40* (2013.01); *B60W 30/188* (2013.01); *Y02T 10/6286* (2013.01); *Y10S 903/93* (2013.01); *Y10S 903/946* (2013.01)

(58) Field of Classification Search
CPC .......................... B60W 20/40; F02N 11/0803
USPC ........... 701/22, 51, 61; 477/86, 92, 107, 111
See application file for complete search history.

(56) References Cited

U.S. PATENT DOCUMENTS

| | | | |
|---|---|---|---|
| 5,865,263 A | 2/1999 | Yamaguchi et al. | |
| 2004/0082434 A1* | 4/2004 | Segawa et al. ................ | 477/62 |
| 2006/0293841 A1 | 12/2006 | Hrovat et al. | |
| 2008/0081730 A1* | 4/2008 | Lee et al. ........................ | 477/15 |
| 2009/0112439 A1 | 4/2009 | Kuang et al. | |
| 2009/0145673 A1 | 6/2009 | Soliman et al. | |
| 2011/0021310 A1 | 1/2011 | Kresse et al. | |
| 2012/0083952 A1* | 4/2012 | Smith et al. ................... | 701/22 |
| 2012/0101705 A1 | 4/2012 | Templin | |
| 2013/0023379 A1* | 1/2013 | Bucknor et al. ................ | 477/5 |

* cited by examiner

*Primary Examiner* — Thomas G Black
*Assistant Examiner* — Luke Huynh
(74) *Attorney, Agent, or Firm* — David Kelley; Alleman Hall McCoy Russell & Tuttle LLP

(57) ABSTRACT

Systems and methods for improving operation of a hybrid vehicle are presented. In one example, a difference between estimated torque output of an active torque source in a driveline and actual torque output of the active torque source is mitigated via entering a driveline speed control mode. The methods and systems may be useful when switching between different driveline modes of operation.

11 Claims, 4 Drawing Sheets

SYSTEMS AND METHODS FOR DRIVELINE TORQUE CONTROL

FIELD

The present description relates to systems and methods for improving driveline torque control for a vehicle. The methods may be particularly useful during transitions between different powertrain operating modes where variations in the torque output of driveline torque sources may be noticeable.

BACKGROUND AND SUMMARY

A hybrid vehicle driveline may include two or more torque sources, such as an engine and a motor, for supplying torque to propel a vehicle. The torque sources may be used independently or together to propel the vehicle. In electric only mode, the motor may supply torque to the vehicle driveline while the engine remains stopped. Conversely, in engine only mode, the engine may supply torque to the vehicle driveline while the motor rotates with the engine yet provides no torque to the driveline. In still other modes, the engine and the motor may both supply torque to the driveline to meet driver demand torque.

Torque output from a motor may be estimated via current supplied to the motor. However, manufacturing and environmental variations that may introduce errors into the motor torque estimate. Likewise, engine torque may be estimated based on flow of air and fuel through the engine. However, estimated engine torque may deviate from actual engine torque due to manufacturing and environmental variations that may introduce errors into the engine torque estimate.

If the hybrid driveline is transitioned from electric only mode to engine only mode, and if either or both estimates of engine torque and motor torque are incorrect, the vehicle may accelerate or decelerate during the transition between modes. It may be possible to reduce errors in engine and motor torque via correcting engine and motor torque via torque feedback control; however, torque sensors may increase system cost and reduce system reliability.

The inventors herein have recognized the above-mentioned disadvantages and have developed a method for operating a driveline, comprising: controlling a torque converter impeller speed to a desired torque converter impeller speed based on torque converter impeller speed feedback in response to a transition in active torque sources supplying torque to the driveline.

By entering a speed control mode during a transition in powertrain operating modes, it may be possible to provide the technical result of reducing the possibility of driveline acceleration or deceleration when transitioning between powertrain modes. When the driveline is controlled in a speed control mode, speed of a driveline component is adjusted to a desired speed for the driveline component based on feedback of driveline component speed. For example, a driveline may be controlled to maintain a constant torque converter impeller speed during a transition from electric only mode to engine only mode. Speed of a motor is adjusted to maintain the constant torque converter impeller speed via adjusting an amount of current supplied to the motor. In one example, if the torque converter impeller speed is less than a desired torque converter impeller speed, motor torque may be increased so as to increase torque converter impeller speed to the desired torque converter impeller speed via supplying additional current to the motor. Similarly, if torque converter impeller speed is less than a desired torque converter impeller speed, engine torque may be increased so as to increase torque converter speed to the desired torque converter speed.

The present description may provide several advantages. In particular, the approach may reduce driveline torque disturbances of a hybrid driveline. Further, the approach may improve vehicle drivability. Further still, the approach may reduce driveline wear, thereby increasing the operating life of the driveline.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
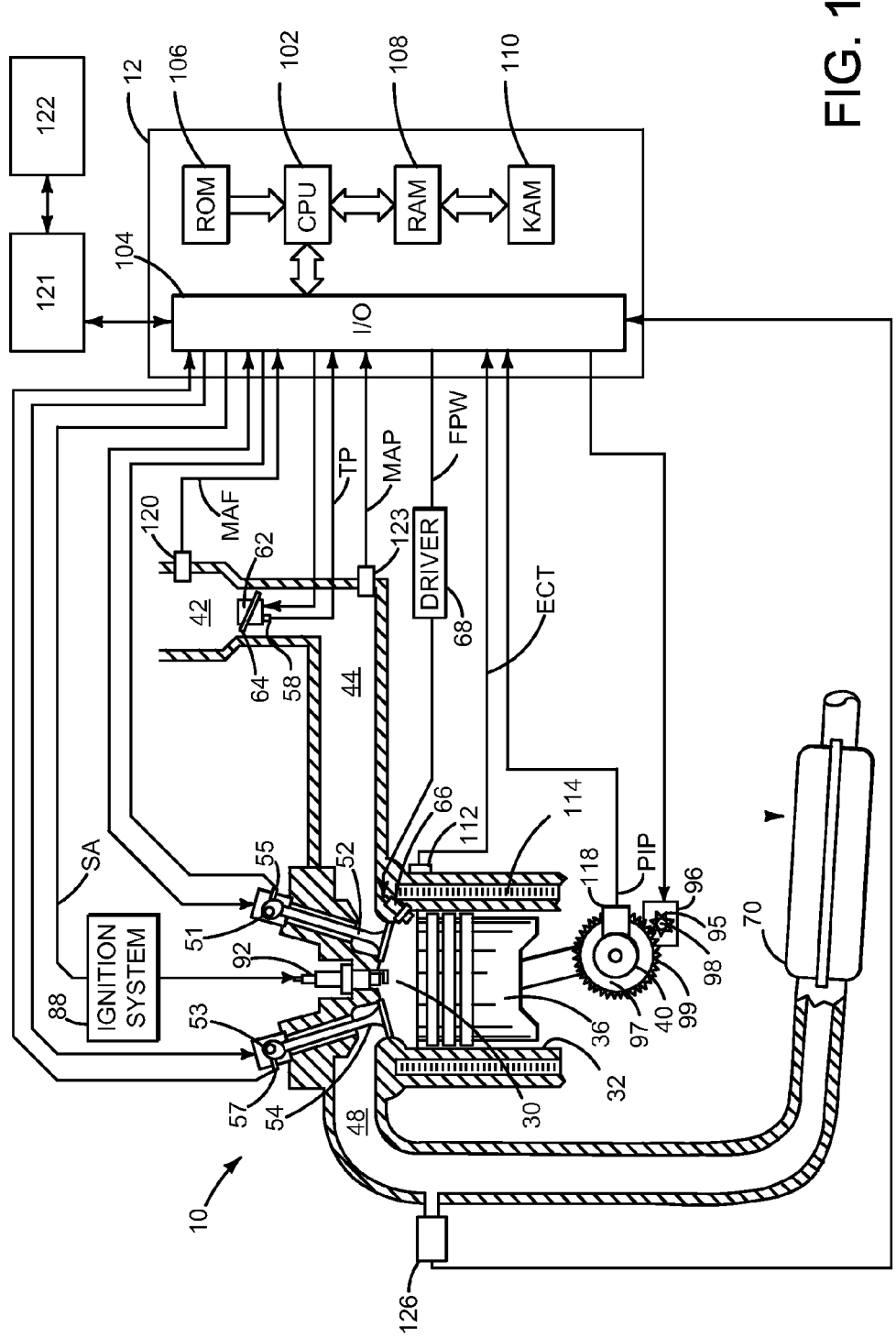
FIG. 1 is a schematic diagram of an engine.
Figure 2:
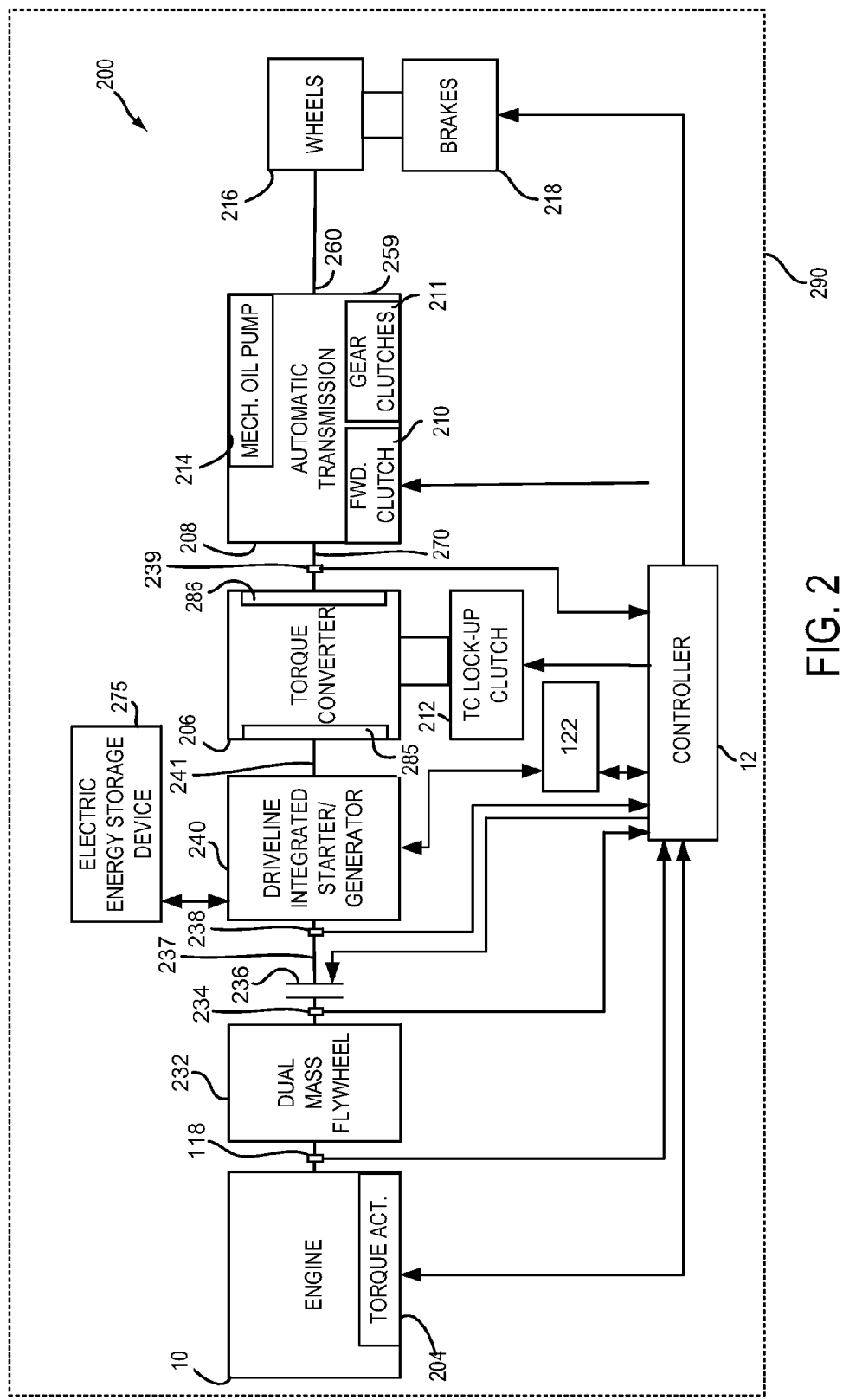
FIG. 2 is shows an example vehicle driveline configuration.
Figure 3A:
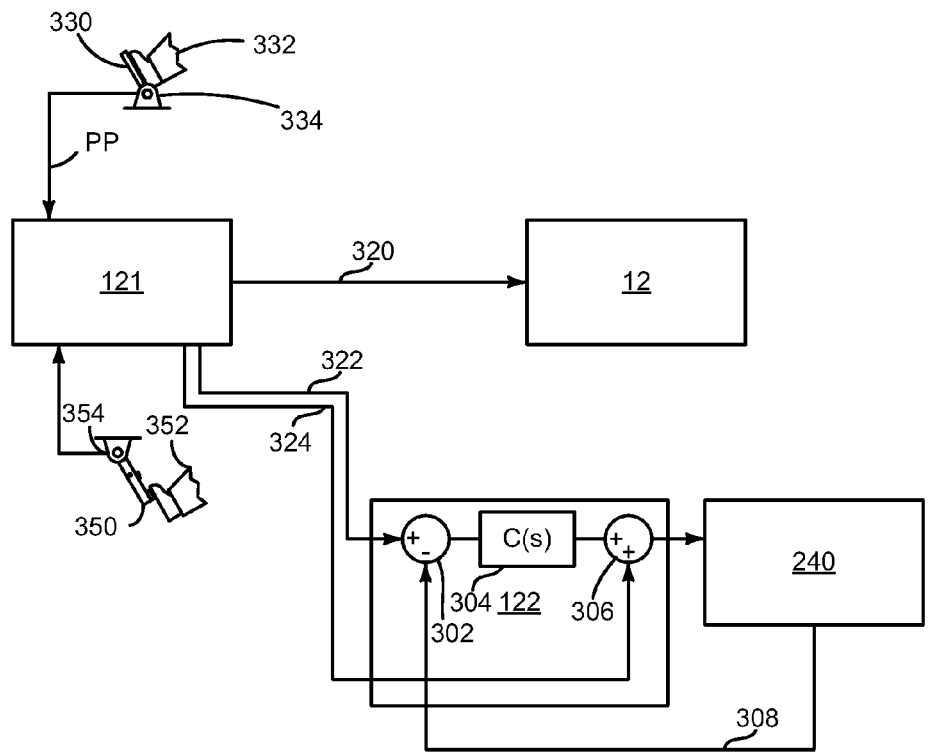
FIGS. 3A and 3B show example system block diagrams for transitioning between driveline operating modes.
Figure 3B:
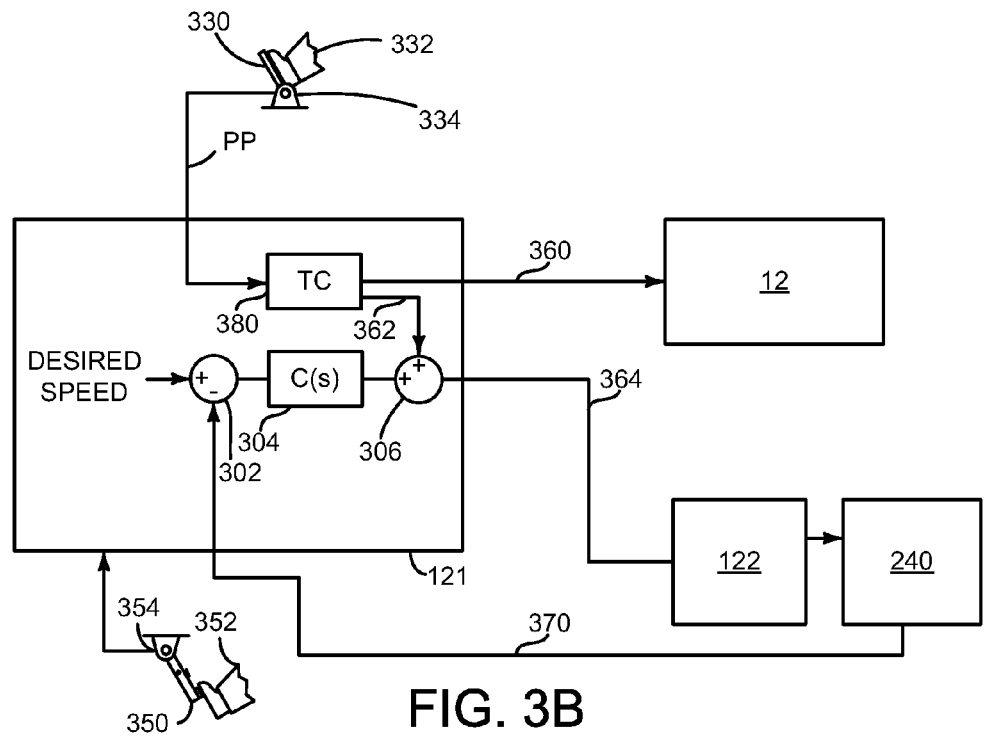
Figure 4:
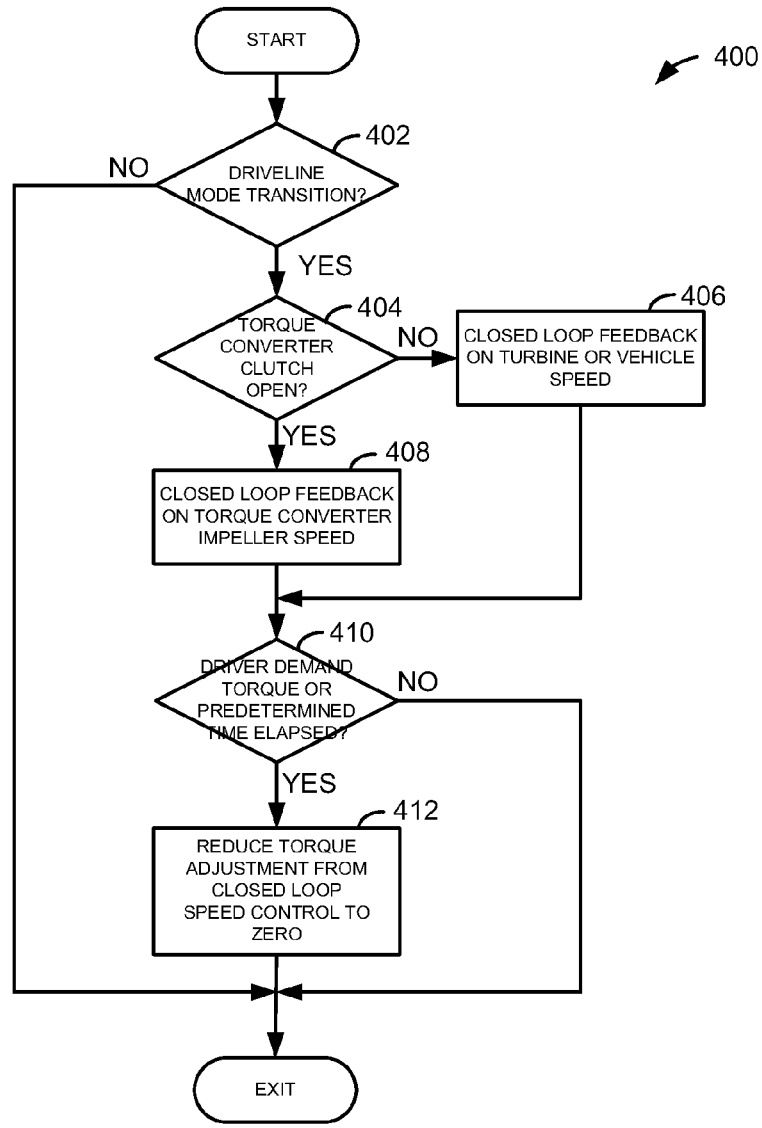
FIG. 4 is a flowchart of an example method for controlling a driveline.

The present description is related to controlling a hybrid vehicle driveline. The driveline may include an engine as is shown in FIG. 1. The engine may be mechanically coupled to other vehicle components including a motor to form a driveline as is shown in FIG. 2. The engine and the motor may be selectively coupled and decoupled to change driveline operating modes. FIGS. 3A and 3B show two block diagrams for operating drivelines during driveline mode changes. A method for operating a driveline during a driveline mode change is shown in FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 communicates with vehicle system controller 121 to receive data from sensors and other vehicle systems such as motor controller 122. For example, controller 12 may receive motor torque and speed from motor controller 122 via vehicle system controller 121.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of engine manifold pressure (MAP) from pressure sensor 123 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200. Driveline 200 may be powered by engine 10 in vehicle 290. Engine 10 may be started with an engine starting system shown in FIG. 1 or via driveline integrated starter/generator (DISG) or electric machine (e.g. motor) 240. Further, engine 10 may generate or adjust torque via torque actuator 204, such as a fuel injector, throttle, etc.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of disconnect clutch 236. Disconnect clutch 236 may be electrically or hydraulically actuated. A position sensor 234 may be positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to the input of the torque converter 206. Rather, DISG 240 rotates at the same rate as the impeller 285. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. DISG 240 is controlled via motor controller 122.

Torque converter 206 includes a turbine 286 to output torque to input shaft 270 of the transmission. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque and the motor output torque are directly transferred via the torque converter clutch to an input shaft (not shown) of transmission 208. Alternatively, the torque converter lock-up clutch 212 may be partially engaged, thereby enabling the amount of torque directly relayed to automatic transmission 208 to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by craning engine 10 and resuming cylinder combustion.

Referring now to FIG. 3A, a high level block diagram of one control system to improve driveline torque control during a transition from a first number of active torque sources that provide torque to a vehicle driveline to a second number of active torque sources that provide torque to the vehicle driveline is shown. The system of FIG. 1 may include a controller as illustrated in FIG. 3A.

Vehicle system controller 121 receives input from vehicle sensors and actuators including but not limited to a position of accelerator pedal 330 from accelerator pedal sensor 334 when accelerator pedal 330 is applied by foot 332 and a position of brake pedal 354 from brake position sensor 350 when brake pedal 350 is applied by foot 352. In one example, a driver demand torque is determined from the position of accelerator pedal 330 and vehicle speed. Vehicle system controller 121 determines an engine torque request from the driver demand torque and sends the engine torque request to engine controller 12 via communication link 320. Vehicle system controller also determines a desired motor or DISG torque and sends the desired motor torque to motor controller 122 via communication link 322. Vehicle system controller also determines a desired motor or DISG speed and sends the desired motor speed to motor controller via communication link 324. Actual motor or DISG speed is input to motor controller 122 via communication link 308. In some examples, communications links 320, 322, 324, and 308 are part of a single communication link (e.g., a CAN bus).

Motor controller 122 includes a controller transfer function 304, a first summing junction 302, and a second summing junction 306. Actual motor speed is subtracted from desired motor speed at summing junction 302 and the result is provided to controller transfer function 304. The output of controller transfer function 304 is a torque and it is added to the requested motor torque at summing junction 306. The motor torque demand is converted to electrical current and it is output to motor or DISG 240. Thus, if there is an error between the desired motor speed and the actual motor speed, motor torque is adjusted to provide the desired motor speed. Since the motor or DISG is positioned between the engine and the transmission, the desired motor speed may commanded to a constant value when the engine is activated or deactivated from the driveline by opening and/or closing the driveline disconnect clutch so that a substantially constant torque (e.g., ±15 N-m) input to the driveline transmission may be provided. In this way, driveline torque disturbances that may temporarily accelerate or decelerate the vehicle during a driveline mode change from a first number of torque generating devices supplying torque to the driveline to a second number of torque generating devices supplying torque to the driveline may be reduced.

Referring now to FIG. 3B, a second high level block diagram of a control system to improve driveline torque control during a transition from a first number of active torque sources that provide torque to a vehicle driveline to a second number of active torque sources that provide torque to the vehicle driveline is shown. The system of FIG. 1 may include a controller as illustrated in FIG. 3B.

In this example block diagram, vehicle system controller 121 receives input from vehicle sensors and actuators including but not limited to a position of accelerator pedal 330 from accelerator pedal sensor 334 when accelerator pedal 330 is applied by foot 332 and a position of brake pedal 354 from brake position sensor 350 when brake pedal 350 is applied by foot 352. Accelerator pedal sensor input is processed by torque control logic 380 and split into an engine torque command and a motor or DISG command. The engine torque command is output from vehicle system controller 121 to engine controller via communication link 360. The motor torque command is output from vehicle system controller 121 to summing junction 306 via communication link 362. The engine torque command is output from vehicle system controller 121 to engine controller 12 via communication link 360.

Vehicle system controller 121 also determines a desired motor speed, and actual motor speed is subtracted from desired motor speed at summing junction 302. The result of summing junction 302 is supplied to controller transfer function 304. The output of controller transfer function 304 is a torque and it is added to the desired motor torque as determined by torque control logic 380 at summing junction 306. Thus, in this example, the vehicle system controller includes a controller that adjusts motor or DISG torque to provide a desired driveline speed. The motor torque command is output from summing junction 306 to motor controller 122 via communication link 364.

Motor controller 122 converts the motor torque command to an electrical current and the current is output to DISG 240. The speed of DISG 240 is fed back to summing junction 302 via communications link 370. In some examples, communications links 360, 362, 364, and 370 are part of a single communication link (e.g., a CAN bus).

Consequently, if there is an error between the desired motor speed and the actual motor speed, motor torque is adjusted to provide the desired motor speed. Because the motor or DISG is positioned between the engine and the transmission, the desired motor speed may commanded to a constant value when the engine is activated or deactivated from the driveline by opening and/or closing the driveline disconnect clutch so that a substantially constant torque (e.g., ±15 N-m) input to the driveline transmission may be provided. In this way, driveline torque disturbances that may temporarily accelerate or decelerate the vehicle during a driveline mode change from a first number of torque generating devices supplying torque to the driveline to a second number of torque generating devices supplying torque to the driveline may be reduced by temporarily entering a driveline component speed control mode.

Referring now to FIG. 4, a method for controlling driveline torque during a transition between a first number of active torque producing devices supplying or absorbing torque to or from the driveline to a second number of active torque producing devices supplying or absorbing torque to or from the driveline is shown. The method of FIG. 4 may be stored as executable instructions in non-transitory memory of the system shown in FIG. 1.

At 402, method 400 judges whether or not a driveline mode change request is present. A driveline mode change request may be initiated in response to vehicle operating conditions such as driver demand torque, battery state of charge (SOC), vehicle speed, and engine speed. During a driveline mode change request, the driveline may transition from a first number of active torque producing devices supplying torque to the driveline to a second number of active torque producing devices supplying torque to the driveline. For example, the driveline may transition from an electric only mode where an electric motor is a sole active torque producing device supplying torque to the driveline to an engine and electric mode where both an engine and a motor supply torque to the driveline.

Additionally, a driveline mode request may include where one or more active torque supplying devices stop supplying torque to the driveline while one or more active torque supplying devices begin to supply or absorb torque to or from the driveline. For example, the driveline may transition from an engine only mode where an engine solely supplies torque to the driveline to an electric only mode where a motor solely supplies torque to the driveline or vice-versa. In still other examples, one or more electric machines may provide or absorb torque to or from the driveline in a first mode without an engine providing or absorbing torque to or from the driveline, transitioning to a second mode where the engine solely or in combination with one or more electric machines provides or absorbs torque to or from the driveline during a driveline mode transition. The driveline may also perform a mode transition via changing from engine only mode to a mode where the engine and motor provide or absorb torque to or from the driveline.

The transition from one driveline mode to another mode begins from a time of a mode change request until the mode transition is complete. A driveline clutch may be opened or closed to activate one or more active torque producing devices. Further, a torque producing device may be activated by supplying energy (e.g., fuel or electrical current) to the torque producing device or a torque control device may be deactivated by stopping energy flow to the torque producing device.

If method 400 judges that a driveline mode change request is present, the answer is yes and method 400 proceeds to 404. Otherwise, the answer is no and method 400 proceeds to exit.

At 404, method 400 judges whether or not a torque converter clutch is open. In on example, a torque converter clutch may be determined to be opened based on a value of a variable stored in memory of a controller. In other examples, method 400 judges whether or not the torque converter clutch is open based on a state of a sensor output. If method 400 judges that the torque converter clutch is open, the answer is yes and method 400 proceeds to 408. Otherwise, the answer is no and method 400 proceeds to 406.

At 406, method 400 compares torque converter turbine speed with a desired torque converter turbine speed and adjusts DISG or motor torque in response to a difference between desired torque converter turbine speed and actual torque converter turbine speed. In one example, the desired torque converter turbine speed is the torque converter turbine speed at a time just before the driveline mode transition occurs so that the torque converter turbine speed may be maintained at the same speed during the driveline mode change. Alternatively, method 400 may compares vehicle speed with a desired vehicle speed and adjusts DISG or motor torque in response to a difference between desired vehicle speed and actual vehicle speed. In one example, the desired vehicle speed is the vehicle speed at a time just before the driveline mode transition occurs so that the vehicle speed may be maintained at the same speed during the driveline mode change.

Thus, a driveline speed is feedback and the basis for adjusting DISG torque to maintain driveline speed at a same speed before, during, and after a driveline mode transition. Increasing the DISG torque increases DISG speed to allow additional torque to be supplied to the torque converter turbine or vehicle wheels when torque converter turbine speed or vehicle speed is lower than desired so that the driveline speed may accelerated to maintain the desired driveline speed. Similarly, decreasing the DISG torque decreases DISG speed to allow less torque to be supplied to the torque converter turbine or vehicle wheels when torque converter turbine speed or vehicle speed is greater than is desired so that the driveline speed may decelerate to maintain the desired driveline speed. Method 400 proceeds to 410 after DISG torque is closed loop feedback controlled in response to turbine speed or vehicle speed so that vehicle speed may be maintained.

Alternatively or in addition, engine torque may be adjusted in response to torque converter turbine speed or vehicle speed via adjusting the amount of fuel and/or air supplied to the engine if the engine is activated during the driveline mode change.

At 408, method 400 provides closed loop feedback to maintain torque converter impeller speed at a desired speed. In one example, method 400 adjusts the torque converter impeller speed to a desired torque converter impeller speed. The desired torque converter impeller speed may be the torque converter impeller speed just before the driveline mode transition request or a speed that is based on driver demand torque and transmission gear during the driveline mode transition. The actual or measured torque converter impeller speed is subtracted from the desired torque converter impeller speed and the DISG motor torque is adjusted to reduce the torque converter impeller speed error. In this way, the DISG motor torque is closed loop controlled in response to torque converter impeller speed. Method 400 proceeds to 410 after DISG motor torque is adjusted.

Alternatively or in addition, engine torque may be adjusted in response to torque converter impeller speed via adjusting the amount of fuel and/or air supplied to the engine if the engine is activated during the driveline mode change.

At 410, method 400 judges whether driver demand torque has changed by more than a predetermined amount or if more than a predetermined amount of time has elapsed since the driveline mode transitions began. If either the driver demand torque has changed by more than the predetermined amount or the predetermined amount of time has elapsed, the answer is yes and method 400 proceeds to 412. Otherwise, the answer is no and method 400 proceeds to exit.

At 412, method 400 gradually reduces the DISG torque adjustment from the closed loop speed control to zero. For example, if the DISG torque is adjusted in response to torque converter impeller speed at 408, method 400 reduces the DISG torque adjustment that is based on the error between the actual torque converter impeller speed and the desired torque converter impeller speed to zero. On the other hand, if the DISG torque is adjusted in response to torque converter turbine speed at 406, method 400 reduces the DISG torque adjustment that is based on the error between the actual torque converter turbine speed and the desired torque converter turbine speed to zero. Method 400 proceeds to exit after the DISG torque is adjusted to eliminate torque based on driveline speed feedback during the driveline mode transition.

Thus, method 400 provides for operating a driveline, comprising: controlling a torque converter impeller speed to a desired torque converter impeller speed based on torque converter impeller speed feedback in response to a transition in active torque sources supplying torque to the driveline. The transition in active torque sources may be a change in a number of active torque sources supplying torque to the driveline, a change from one active torque source (e.g., a torque source that may be controlled to a desired torque output via controlling energy (electrical current, fuel, spark timing, fuel injection timing, etc.) supplied to the torque source, such as an engine or motor) solely supplying torque to the driveline to a different active torque source solely supplying torque to the driveline. The method further comprises controlling the torque converter impeller speed to the desired torque converter impeller speed based on torque converter impeller speed feedback in response to the transition in active torque sources absorbing torque from the driveline.

In some examples, the method includes where the transition in active torque sources is a change in a number of active torque sources. The method includes where the transition in active torque sources includes activating an engine and supplying torque to vehicle wheels via the engine. The method includes where the transition in active torque sources includes activating a motor and supplying torque to the vehicle wheels via the motor. The method includes where the transition in active sources includes deactivating an engine supplying torque to the driveline. The method includes where the transition in active sources includes deactivating a motor and supplying torque to the driveline.

In another example, the method of FIG. 4 provides for operating a driveline, comprising: during a first, electric only mode, driving a vehicle with a motor decoupled from the engine and through a transmission; transitioning to a second, engine only mode, driving the vehicle with the engine coupled to the motor via reducing motor torque, where engine torque or motor torque is temporarily adjusted during the transition to maintain vehicle speed, the engine torque or motor torque adjustment gradually decreased. The method includes where the engine or motor torque is temporarily adjusted to maintain vehicle speed via torque converter impeller speed feedback.

The method also includes where the engine or motor torque is temporarily adjusted to maintain vehicle speed via torque converter turbine speed feedback. The method includes where the engine or motor torque is temporarily adjusted to regulate (e.g., adjust to a desired speed including maintaining a constant speed) vehicle speed or acceleration via vehicle speed feedback. The method includes where the engine torque or motor torque adjustment is gradually decreased over a predetermined time duration. The method includes where the engine torque or motor torque adjustment is gradually decreased over as driver demand torque changes. The method also includes where during the transition to the second engine only mode, engine torque is increased and motor torque is decreased.

The method of FIG. 4 also provides for operating a driveline, comprising: controlling a driveline device speed to a desired driveline device speed based on driveline device speed feedback in response to a change in active torque sources supplying torque to the driveline. The method includes where the driveline device speed is one of a torque converter turbine speed, a torque converter impeller speed, and a vehicle wheel speed. The method includes where the driveline is transitioned from a motor solely supplying torque to vehicle wheels to the motor and an engine supplying torque to the vehicle wheels. The method also includes where the driveline is transitioned from an engine solely supplying torque to vehicle wheels to the motor and an engine supplying torque to the vehicle wheels. The method includes where the driveline device speed is temporarily controlled to the desired driveline device speed during a transition of the change in active torque sources supplying torque to the driveline. In some examples, the method includes where driveline device speed is controlled via adjusting torque of an active torque source.

As will be appreciated by one of ordinary skill in the art, method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a driveline, comprising:
   during a first, electric only mode, driving a vehicle with a motor decoupled from an engine and through a transmission; and
   transitioning to a second, engine only mode, driving the vehicle with the engine coupled to the motor via reducing motor torque, where engine torque or motor torque is temporarily adjusted during the transition via speed feedback to regulate vehicle speed or acceleration, the engine torque or motor torque adjustment gradually decreased, and where during the transition to the second engine only mode, engine torque is increased and motor torque is decreased.

2. The method of claim 1, where the engine or motor torque is temporarily adjusted to maintain vehicle acceleration via torque converter impeller speed feedback.

3. The method of claim 1, where the engine or motor torque is temporarily adjusted to maintain vehicle speed via torque converter turbine speed feedback.

4. The method of claim 1, where the engine or motor torque is temporarily adjusted to maintain vehicle speed via vehicle speed feedback.

5. The method of claim 4, where the engine torque or motor torque adjustment is gradually decreased over a predetermined time duration.

6. The method of claim 1, where the engine torque or motor torque adjustment is gradually decreased as driver demand torque changes.

7. A method for operating a driveline, comprising:
   controlling a driveline device speed to a desired driveline device speed based on a driveline device speed feedback in response to a change in active torque sources supplying torque to the driveline, where the driveline device speed is a speed of a driveline device positioned on a side of a disconnect clutch that is coupled to vehicle wheels via a transmission, and where the driveline device speed is controlled via adjusting torque of an active torque source.

8. The method of claim 7, where the driveline device speed is one of a torque converter turbine speed, a torque converter impeller speed, and a vehicle wheel speed, and where controlling the driveline device speed includes subtracting the driveline device speed feedback from a desired torque converter impeller speed and adjusting torque of the active torque source based on subtracting the driveline device speed feedback from the desired torque converter impeller speed.

9. The method of claim 7, where the driveline is transitioned from a motor solely supplying torque to vehicle wheels to the motor and an engine supplying torque to the vehicle wheels.

10. The method of claim 7, where the driveline is transitioned from an engine solely supplying torque to vehicle wheels to a motor and the engine supplying torque to the vehicle wheels.

11. The method of claim 7, where the driveline device speed is temporarily controlled to the desired driveline device speed during a transition of the change in active torque sources supplying torque to the driveline.

* * * * *